United States Patent [19]

Fisher et al.

[11] Patent Number: 4,864,205

[45] Date of Patent: Sep. 5, 1989

[54] METHOD FOR COORDINATED CONTROL OF MOTION DEVICES

[75] Inventors: William D. Fisher, East Palo Alto; M. Shahid Mujtaba, Milpitas, both of Calif.

[73] Assignee: Hewlett-Packard Company, Palo Alto, Calif.

[21] Appl. No.: 236,870

[22] Filed: Aug. 26, 1988

Related U.S. Application Data

[63] Continuation-in-part of Ser. No. 107,423, Oct. 9, 1987, abandoned.

[51] Int. Cl.[4] ............................................. G05B 19/10
[52] U.S. Cl. ................................. 318/568.11; 901/15; 318/568.18
[58] Field of Search ............................ 318/568; 901/15

[56] References Cited

U.S. PATENT DOCUMENTS

| | | | |
|---|---|---|---|
| 4,488,242 | 12/1984 | Tabata et al. | 318/568 X |
| 4,547,858 | 10/1985 | Horak | 901/15 X |
| 4,769,583 | 9/1988 | Goor | 318/568 |

OTHER PUBLICATIONS

Introduction to Robotics Mechanics & Control, John J. Craig, 1986, Addison–Wesley Publishing Company, Inc., pp. 191–209, ("Trajectory Generation").

Robot Manipulators: Mathematics, Programming, and Control, Richard P. Paul, MIT Press, 1981, pp. 119–139, ("Motion Trajectories").

K. G. Shin and N. D. McKay, "Minimum–Time Trajectory Planning for Industrial Robots With General Torque Constrains", in *International Conference of Robotics and Automation*, IEEE Computer Society, 1986, San Francisco, CA.

K. G. Shin and N. D. McKay, "Selection of Near–Minimum Time Geometric Paths for Robotic Manipulators", *IEEE Transactions on Automatic Control*, vol. AC–31, Jun. 1986.

K. G. Shin and N. D. McKay, "A Dynamic Programming Approach to Trajectory Planning of Robotic Manipulators", *IEEE Transactions on Automatic Control*, vol. AC–31, Jun. 1986.

K. G. Shin and N. D. McKay, "Minimum–Time Control of Robotic Manipulators With Geometric Path Constrains", *IEEE Transactions on Automatic Control*, vol. AC–30, Jun. 1985.

V. T. Rajan, "Minimum Time Trajectory Planning", in *International Conference of Robotics and Automation*, IEEE Computer Society, 1985, St. Louis, Missouri.

(List continued on next page.)

Primary Examiner—William M. Shoop, Jr.
Assistant Examiner—Saul M. Bergmann

[57] ABSTRACT

A kinematic method to operate a multi-jointed robot to achieve coordinated, speed-invariant motion when the robot's end effector is moved along a predefined path. To accomplish such operation, a total execution time function is defined which is a function of acceleration time, slew time, and deceleration time for the joints. Values for the acceleration time, slew time, and deceleration time are calculated which minimize the total time function subject to constraints on the displacement, the limiting velocity, the limiting acceleration, and the limiting deceleration for the joints. Then, the end effector of the robot is operated such that all joints start moving at the same instant, all joints accelerate for the same period, all joints slew for the same period, and all joints decelerate for the same period. During such motion, at least one moving joint is responsible for determining the acceleration time, at least one other moving joint (or possibly the same joint) is responsible for determining the deceleration time, and at least one moving joint (or one of the two prior joints) is responsible for determining the slew time. Also during such motion, each moving joint will progress through its motion at the same relative rate; that is, at the time the ith joint completes some percentage of its travel distance, any other moving joint will complete the same percentage of its travel distance.

22 Claims, 4 Drawing Sheets

OTHER PUBLICATIONS

G. Sahar and M. J. Hollerbach, "Planning of Minimum-Time Trajectories for Robot Arms", *International Journal of Robotics Research,* vol. 5, Fall 1984.

M. S. Mujtaba and W. D. Fisher, "Hal, A Work Station Based Intelligent Robot Control Environment", in *ROBOTS 11/ISIR 17 Conference,* 1987, Chicago, IL.

F. Pfeiffer and R. Johanni, "A Concept for Manipulator Trajectory Planning", *IEEE Journal of Robotics and Automation,* vol. RA-3, Apr. 1987.

J. Y. S. Luh and M. W. Walker, "Minimum-Time Along the Path for a Mechanical Arm", in *Conference on Decision and Control,* IEEE Automated Control Society, 1977, New Orleans, LA.

M. S. Mujtaba, "Exploratory Study of Computer Integrated Assembly Systems", Tech. Rep., STAN-CS-76-568, Chapter VIII, Stanford: *Computer Science Dept., Jun. 1977.*

B. K. Kim and K. G. Shin, "Minimum-Time Path Planning for Robot Arms and Their Dynamics", *IEEE Transactions on Systems, Man and Cybernetics,* vol. SMC-15, Mar./Apr. 1985.

C. S. Lin and RP. R. Chang, "Approximate Optimum Paths of Robot Manipulators Under Realistic Physical Constrains", in *International Conference of Robotics and Automation,* IEEE Computer Society, 1985, St. Louis, MO.

H. P. Geering, L. Guzzella, S. A. R. Hepner, and C. H. Onder, "Time-Optimal Motions of Robots in Assembly Tasks", *IEEE Transactions on Automatic Control,* vol. AC-31, Jun. 1986.

M. E. Kahn, "The Near-Minimum-Time Control of Open-Loop Articulated Kinematic Chains", Tech. Rep., AIM 106, Stanford: Stanford Artificial Intelligence Lab, Dec. 1969.

J. E. Bobrow, S. Dubowsky, and J. S. Gibson, "Time-Optimal Control of Robotic Manipulators", *International Jountal of Robotics Research,* vol. 4, Fall 1985.

R. H. Castain and R. P. Paul, "An On-Line Dynamic Trajectory Generator", *International Journal of Robotics Research, vol. 3, Spring 1984.*

METHOD FOR COORDINATED CONTROL OF MOTION DEVICES

RELATED APPLICATION:

This application is a continuation-in-part Ser. No. 107,423 filed Oct. 9, 1987, now abandoned.

BACKGROUND OF THE INVENTION

1. Field of the Invention

The present invention generally relates to motion control and, more particularly, to the control of motion of machines such as multi-jointed robots.

2. State of the Art

In industrial settings, robots generally each have at least one movable hand, or end effector, connected to a base by a plurality of movable joints. Normally, a servo motor is located at each joint in such robots to allow the end effectors to manipulate parts and tools in a controlled manner.

For a multi-jointed robot to perform complex and varied tasks, it is necessary to have coordination between the servo motors at each of the joints of the robot. More particularly, in any manipulation requiring a robotic end effector to move from one location to another, it is necessary to control the motion of each of the servo motors to prevent the end effector from overshooting, or undershooting, a targeted location. Since servo motors at different joints in a robot usually differ from one another in terms of their acceleration, deceleration and velocity characteristics, each servo motor must usually be controlled individually.

It is well known that servo motors for multi-jointed robots can be programmed for kinematic control by microprocessor-based computers. Often, the programming objective is to minimize the time required for an end effector to move from one location to another along a predefined path. For example, according to one strategy for achieving minimum travel time, all servo motors are operated at their maximum accelerations, decelerations, and/or maximum velocities.

In practice, it is conventional to test a sequence of motions of a multi-jointed robot in slow motion. Then, after an entire sequence of motions is tested, servo motors at the joints are simultaneously operated at normal speed. One difficulty with such practice is that the path of travel of an end effector of a multi-jointed robot may change when execution speed is increased. For example, rather than following a path segment that was planned during slow-motion testing, an end effector may deviate from the path segment when the joint motors are operated at full speed. Such speed-variant motion of an end effector can cause collisions with surrounding fixtures, can damage devices being manipulated and assembled by the robot, and can damage the robot itself. Thus, for multi-jointed robots, it is not only important that motions be accomplished in minimum time but, also, that the motions be speed invariant.

To achieve speed-invariant motions in multi-jointed robots, each joint motor can be programmed to function in normalized time. That is, each component motion can be assigned an equal fraction of the whole motion. In practice, the equations that have been employed in programming normalized-time motions are cubic acceleration and deceleration polynomials or other continuous functions. Usage of such motion equations, however, does not result in minimum motion times.

SUMMARY OF THE INVENTION

Generally speaking, the present invention provides a kinematic method to operate a multijointed robot to achieve coordinated, speed-invariant motion in minimum time when the robot's end effector is moved along a predefined path. To accomplish such operation, a total execution time function is defined which, in the generalized case, is as follows:

$$t_T = t_a + t_s + t_d$$

wherein $t_T$ is the total time period for motion of the joints, $t_a$ is the acceleration time period, $t_s$ is the slew time period, and $t_d$ is the deceleration time period. Then, for each of the joints, values for the acceleration time, slew time, and deceleration time are calculated which minimize the total time function subject to the constraints that:

$$t_a + 2t_s + t_d \geq \frac{2Q_i}{V_{limi}}$$

$$t_a^2 + 2t_a t_s + t_a t_d \geq \frac{2Q_i}{A_{limi}}$$

$$t_d^2 + 2t_d t_s + t_d t_a \geq \frac{2Q_i}{D_{limi}}, \text{ and}$$

$$t_a, t_s, t_d \geq 0,$$

where:

$Q_i$ is the displacement of any one joint (i.e., the ith joint);

$V_{limi}$ is the limiting velocity for the ith joint;

$A_{limi}$ is the limiting acceleration for the ith joint; and $D_{limi}$ is the limiting deceleration for the ith joint.

Then, the end effector of the robot is operated such that all joints start and stop moving at the same time with all of the joints accelerating for time period $t_a$, all of the joints slewing for time period $t_s$ and all of the joints deceleration for time period $t_d$. In accomplishing such ratio-locked motion, at least one moving joint is responsible for determining the acceleration time, at least one other moving joint (or possibly the same joint) is responsible for determining the deceleration time, and at least one moving joint (or one of the two prior joints) is responsible for determining the slew time. Analytically, the above-stated minimization problem for multiple joints can be solved by defining quantities $t^*$, $t^*_a$, $t^*_s$ and $t_d^*$, as follows:

$$t_s^* = \max_i \left( \frac{2Q_i}{V_{limi}} \right)$$

$$(t_a^*)^2 = \max_i \left( \frac{2Q_i}{A_{limi}} \right)$$

$$(t_d^*)^2 = \max_i \left( \frac{2Q_i}{D_{limi}} \right), \text{ and}$$

$$t^* = \max\{t_s^*, [(t_a^*)^2 + (t_d^*)^2]^{\frac{1}{2}}\}.$$

where time $t^*$ determines the time in which each moving joint of robot 1 begins and ends its motion. Then, $$t_a = \frac{(t_a^*)^2}{t^*}$$

$$t_d = \frac{(t_d^*)^2}{t^*}$$

$$t_s = \frac{(t^* - t_a - t_d)}{2}.$$

Definitions

The following is a list of terms and their definitions that will be used in the following description:

$t_{ai}$ = acceleration time for a given joint (i.e., the ith joint) of a robot;

$t_{si}$ = slew time for the ith joint;

$t_{di}$ = deceleration time for the ith joint;

$t_{Ti}$ = total time for the ith joint motion;

$Q_i$ = total displacement for the ith joint;

$v_{i(t)}$ = velocity of the ith joint as a function of time;

$V_i$ = maximum velocity of the ith joint during a given motion;

$V_{limi}$ = limiting velocity of the ith joint;

$A_i$ = maximum acceleration of the ith joint during a given motion;

$A_{limi}$ = limiting acceleration of the ith joint;

$D_i$ = maximum deceleration of the ith joint during a given motion; and $D_{limi}$ = limiting deceleration of the ith joint.

DETAILED DESCRIPTION OF THE PREFERRED EMBODIMENT

Figure 1:
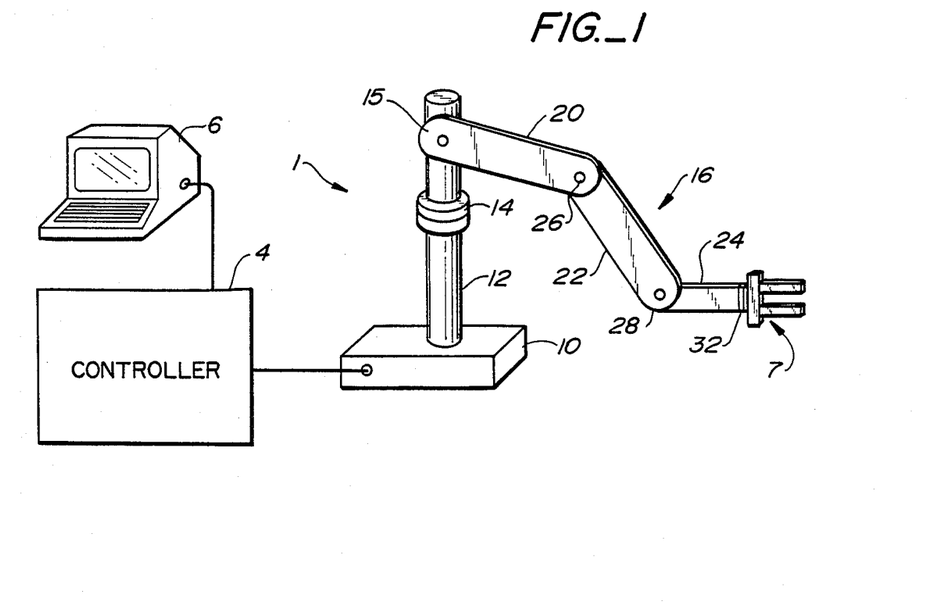
FIG. 1 an example of an industrial robot including its control system.

In FIG. 1, a multi-jointed robot 1 is connected to a controller 4 that receives instructions from a programmable computer 6. The purpose of the instructions is to direct the actions of an end effector 7 connected to robot 1. End effector 7 is shown as a gripper, but it could be any tool connected to robot 1.

Generally speaking, each of the joints of robot 1 is controlled by a separately programmable servo motor. It can be assumed that each servo motor allows only one degree of freedom of motion, and that a sensor is located at each joint to measure such motion. For purposes of illustration, robot 1 is shown as having a base 10 to which is mounted a postlike member 12 including a joint 14 which allows horizontally pivotal motion. Adjacent the end of post 12 is a joint 15 to which is connected an arm 16 composed of three segments 20, 22 and 24. Segments 20 and 22 are connected by joint 26, and segments 22 and 24 are connected by joint 28. At the distal end of arm 16, a joint 32 connects end effector 7 to segment 24.

Equations for motion of any one of the joints (i.e., the ith joint) of robot 1 can be stated as follows:

$$V_i(t) = \begin{cases} A_i t & 0 \le t \le t_{ai} \\ V_i & t_{ai} \le t \le (t_{ai} + t_{si}) \\ D_i(t_{Ti} - t) & (t_{ai} + t_{si}) \le t \le t_{Ti}. \end{cases} \quad (1)$$

Under the assumption that accelerations and decelerations are constant at each of the joints of robot 1 of FIG. 1, the ith joint reaches its maximum velocity at times $t_{ai}$ and $t_{di}$. The maximum velocity for the ith joint can be stated as:

$$V_i = A_i t_{ai} = D_i t_{di}. \quad (2)$$

Thus, total displacement for motion of the ith joint is:

$$Q_i = (\tfrac{1}{2})(A_i t^2_{ai}) + V_i t_{si} + (\tfrac{1}{2})(D_i t^2_{di}). \quad (3)$$

When each of the joints of robot I is considered individually, the minimum execution time for any motion of any one of the joints is achieved when that joint operates at its limiting velocity, acceleration and deceleration. Collectively, however, such motion for robot 1 is uncoordinated since generally not all joints will reach their destinations at the same time.

For robot 1 to move with coordination, all of its joints must start and stop at the same time. The overall minimum time for such motion of the multiple joints of robot 1 is the maximum value of total minimum times, $t_{Ti}$, for the joints considered individually. It should be noted that if all joints of robot 1 start moving at the same time and complete their motions exactly at the overall minimum time, each joint will generally have different acceleration, slew and deceleration times than the other joints.

A method will now be described to operate the joints of robot 1 to achieve coordinated motion which is speed-invariant when end effector 7 is moved between any two positions along a predefined path. According to the method, all moving joints will begin their motion at the same time, or at substantially the same time, and all moving joints will end their motions at the same time, or at substantially the same time. Moreover, each moving joint will progress through its motion at the same relative rate; for example, at the time the ith joint completes some percentage of its travel distance, say thirty-five percent, the jth joint will complete the same percentage of its travel distance. Such motion will be referred to herein as ratio-locked motion. To simplify the initial description of the ratio-locked method of operating robot 1, it can be assumed that acceleration equals deceleration at each joint and, thus, the total execution time for ratio-locked motion is:

$$t_T = 2t_a + t_s. \quad (4)$$

Under the foregoing assumption, the method of determining the ratio-locked motion involves the steps of calculating values for acceleration and slew times for motion of each joint of the robot to minimize the function of equation (4) subject to the constraints that:

$$t_a + t_s \geq \frac{Q_i}{V_{limi}}, \qquad (5)$$

$$t_a^2 + t_a t_s \geq \frac{Q_i}{A_{limi}}, \text{ and} \qquad (6)$$

$$t_a, t_s \geq 0. \qquad (7)$$

When all of the moving joints of a multi-jointed robot are operated with acceleration and slew times which satisfy the conditions of equations (5) through (7), ratio-locked motion of the end effector of the multi-jointed robot is speed-invariant and, moreover, the end-effector motion is completed in minimum time.

In most industrial applications, an end effector of a multi-jointed robot is required to travel a path that comprises two or more discrete segments. For such a path, the above-described method must be repeated for each of the segments. It should be noted that a joint which has the longest acceleration time or longest slew time for one segment of a path may not be the joint which has the longest acceleration or slew time for another segment of the path.

Figure 2:
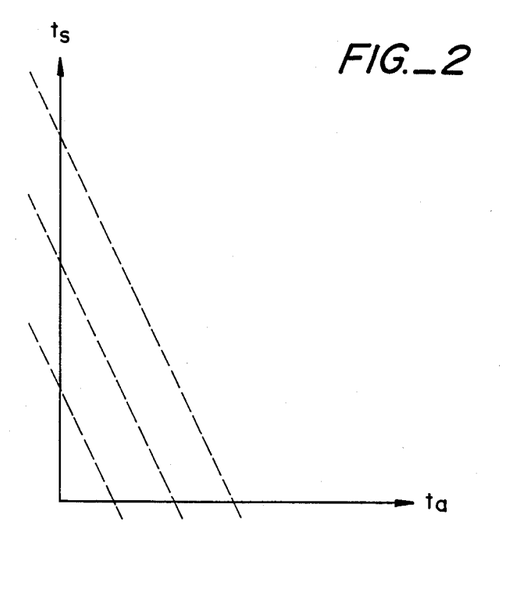
FIG. 2 is a graph showing constant total time lines for motion of a single robotic joint.

Although the optimization problem stated by equations (4) through (7) can be solved by various techniques, the solution methodology is generally simplified by employing graphical techniques. The relationship between $t_a$ and $t_s$ stated in equation (4) for a joint is shown in graphical terms in FIG. 2 for various constant values of total time $t_T$. The sloping lines in the first quadrant of FIG. 2 can be called total execution time lines. For any given one of the total execution time lines for a particular joint, motion of the joint is completed in the same time by any combination of values of acceleration time, $t_a$, and slew time, $t_s$, which defines a point on the line. It may be noted that the slope of each of the total execution time lines is minus two.

For purposes of graphical analysis of motion of a particular joint whose acceleration equals its deceleration, equation (3) can be expressed as:

$$Q_i = A_i t_{ai}^2 + V_i t_{si}. \qquad (8)$$

Substituting the acceleration term in equation (2) into equation (8) yields:

$$Q_i = V_i t_{ai} + V_i t_{si} \qquad (9)$$
$$= V_i(t_{ai} + t_{si})$$

Then, assuming the maximum velocity of the ith joint is limited to $V_{limi}$, equation (9) can be restated as equation (5). That equation can be called the limited velocity equation.

Figure 3:
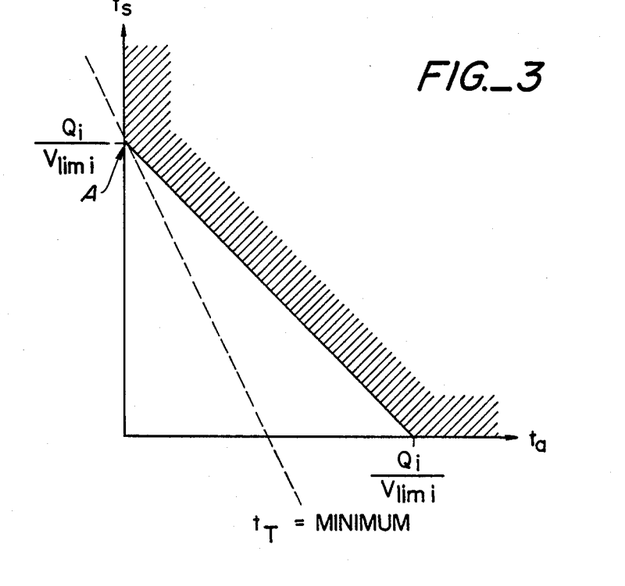
FIG. 3 is a graph showing the region of execution times of a robotic joint operated with limited velocity.

The limited velocity equation is plotted in FIG. 3 for a given value of $Q_i$ and a given value of $V_{limi}$. In the first quadrant of the graph, the region above and to the right of the limited velocity line comprises achievable execution times for motion of the ith joint, given the velocity constraint. The slope of the limited velocity line is minus one, i.e., $$\left.\frac{dt_{si}}{dt_{ai}}\right|_{V_{lim}} = -1. \qquad (10)$$

Because the slope of the limited velocity line is less steep than the slope for the total execution time lines, the minimum total execution time for a given motion of any particular joint (i.e., the ith joint) is defined by the intersection of the limited velocity line for that joint with the $t_s$ axis. In FIG. 3, the intersection point is labelled as Point A. Point A is unique because there is no other point where the region of achievable execution times, given the velocity constraint, is intercepted by a total time line having a value less than the total time line which passes through point A.

Further for purposes of graphical analysis of motion of the ith joint, the velocity term of Equation (2) can be substituted into equation (8) to yield:

$$Q_i = A_i t_{ai}^2 + A_i t_{ai} t_{si} \qquad (11)$$
$$= A_i(t_{ai}^2 + t_{ai} t_{si}).$$

Then, under the assumption that the maximum acceleration of the ith joint is limited, equation (11) can be restated as equation (6). That equation can be called the limited acceleration equation.

Figure 4:
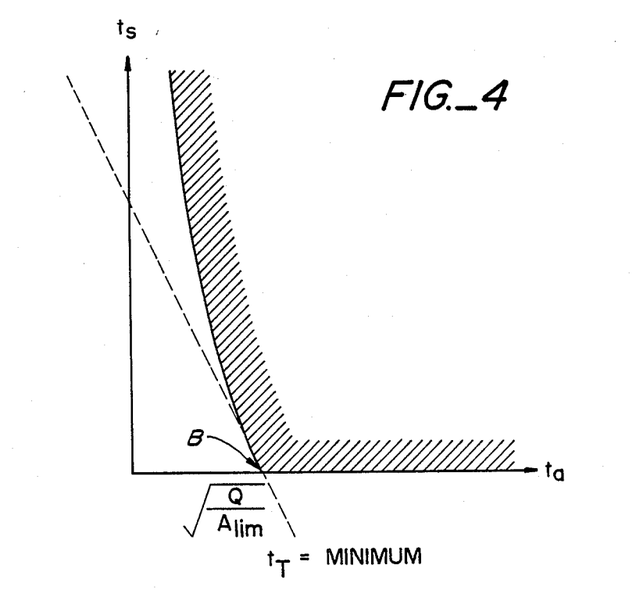
FIG. 4 is a graph showing the region of execution times of a robotic joint operated with limited acceleration under the assumption that the acceleration limit equals the deceleration limit.

The limited acceleration equation is plotted in FIG. 4 for a given value of $Q_i$ and $A_{limi}$. It should be noted that the limited acceleration line has curvature. The region above and to the right of the limited acceleration line comprises achievable execution times for the motion of the ith joint, given the acceleration constraint. The intercept point at the $t_a$ axis is labelled point "B" in FIG. 4. Graphically, point B represents the minimum execution time for a given motion of the ith joint with the acceleration constraint. Point B is unique because there is no other point where the region of achievable execution times, given the acceleration constraint, is intercepted by a total time line having a value less than total time line which passes through point B.

Figure 5:
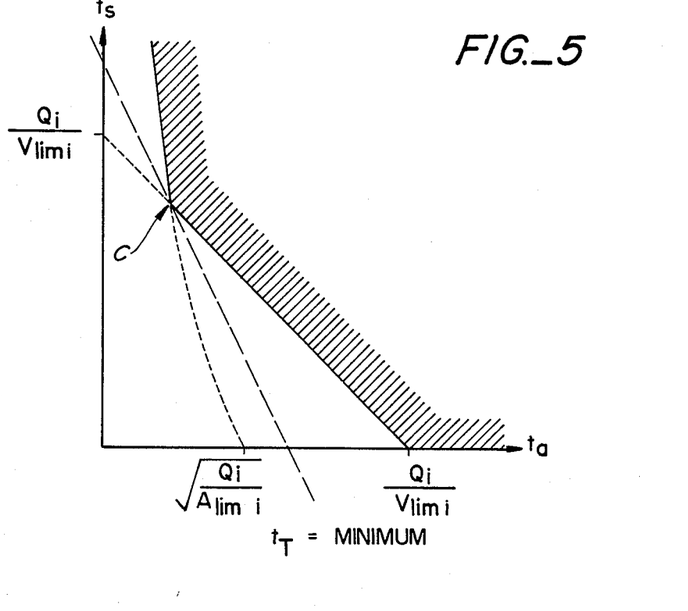
FIG. 5 is a graph showing the region of execution times of a single robotic joint operated with the acceleration and velocity limitations displayed in FIGS. 3 and 4.

If both acceleration and velocity are limited for a given motion of the ith joint of the preceding example and if acceleration of the joint equals its deceleration, the region of achievable execution times for the joint is the area common to the two shaded regions in FIGS. 3 and 4. The common area is shown in FIG. 5 and point "C" at the knee of the boundary line indicates the minimum total execution time for motion of the joint. In other words, there is no point other than point C at which a lesser total time line is tangent to the region of achievable execution times. The $t_a$ axis coordinate for point C is the acceleration time for the given displacement of the ith joint, and the $t_s$ axis coordinate is the slew time. It should be noted that those slew and acceleration times for the ith joint satisfy equations (5) through (7).

For motions involving more than one joint of robot 1, each joint can be understood to have a region of achievable execution times that can be graphically depicted as in FIG. 5. Thus, for a given multi-jointed motion of robot 1 to be speed-invariant, the set of achievable execution times for the moving joints is defined by the area common to all the regions for achievable execution of the moving joints separately.

Figure 6:
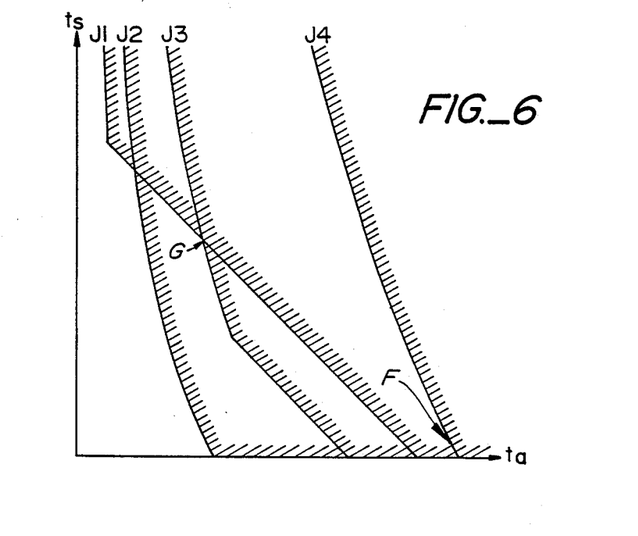
FIG. 6 is a graph showing the region of execution times for coordinated, speed-invariant motion for an end effector of a robot having multiple joints under the assumption that, at each joint, acceleration equals deceleration.

FIG. 6 illustrates an example for the case where robot 1 has four joints which move subject to constraints on maximum acceleration and velocity at each joint and are subject to the assumption that acceleration equals deceleration at each joint. In FIG. 6, regions of achievable execution times for each of the four joints individually are defined by the hatched regions above and to the right of the lines J1 through J4, respectively. That is, achievable execution times for a given displacement of the first joint, considered individually, are defined by the region above and to the right of line J1; achievable execution times for the second joint, considered individually, are defined by the region above and to the right of line J2, and so forth. Collectively achievable execution times for the given speed-invariant motion of all four joints are defined only by the region above and to the right of line J4. In particular, the minimum achievable total execution time for the speed-invariant motion is identified at point F. Point F is unique because there is no other point where the region of achievable execution times for the joints collectively is intercepted by a total time line having a value less than the total time line which passes through point F.

In the case where joint J4 does not move, minimum total execution time for the three remaining joints would be defined by the $t_s$ and $t_a$ axis coordinates of point G in FIG. 6. Here again, Point G is unique because there is no other point where the region of achievable execution times for the three joint J1–J3 collectively is intercepted by a total time line having a value less than total time line which passes through point G. In other words, in the case where acceleration and deceleration are equal at each joint, the minimum execution time for speed-invariant motion of end effector 7 of multijointed robot 1 is determined by two joints at most, regardless of how many joints robot 1 has. Point G in FIG. 6 is determined by joints $J_1$ and $J_3$, not joint $J_2$. Thus, for any single ratio-locked minimum time motion of end effector 7, at least one joint will operate at its limiting acceleration/deceleration for the acceleration time period and one other joint (or possibly the same joint) will operate at its limiting velocity for the duration of the slew time period.

The foregoing graphical methodology for ratio-locked motion can be extended to the case where acceleration and deceleration are not equal at each of the joints of robot 1. Then, for a given motion of effector 7, the methodology to determine the ratio-locked motion is to minimize the total time function:

$$t_T = t_a + t_s + t_d \quad (12)$$

subject to the constraints that:

$$t_a + 2t_s + t_d \geq \frac{2Q_i}{V_{limi}} \quad (13)$$

$$t_a^2 + 2t_a t_s + t_a t_d \geq \frac{2Q_i}{A_{limi}} \quad (14)$$

$$t_d^2 + 2t_d t_s + t_d t_a \geq \frac{2Q_i}{D_{limi}}, \text{ and} \quad (15)$$

$$t_a, t_s, t_d \geq 0. \quad (16)$$

Analytically, the minimization problem stated by equations (12) through (16) can be solved for the multiple joint case by defining quantities $t^*$, $t^*_a$, $t^*_s$ and $t^*_d$, as follows:

$$t_s^* = \max_i \left( \frac{2Q_i}{V_{limi}} \right) \quad (17)$$

$$(t_a^*)^2 = \max_i \left( \frac{2Q_i}{A_{limi}} \right) \quad (18)$$

$$(t_d^*)^2 = \max_i \left( \frac{2Q_i}{D_{limi}} \right), \text{ and} \quad (19)$$

$$t^* = \max \{t_s^*, [(t_a^*)^2 + (t_d^*)^2]^{\frac{1}{2}}\}. \quad (20)$$

Thus, time $t^*$ determines the time in which each moving joint of robot 1 begins and ends its motion. Then, in terms of the quantities $t^*_s$, $t^*_a$ and $t^*_d$, on problem stated by equations (12) through (16) has the following closed-form analytic solution:

$$t_a = \frac{(t_a^*)^2}{t^*} \quad (21)$$

$$t_d = \frac{(t_d^*)^2}{t^*}, \text{ and} \quad (22)$$

$$t_s = \frac{(t^* - t_a - t_d)}{2} \quad (23)$$

Thus, to achieve ratio-locked motion, each of the moving joints of robot 1 will begin to move at the same time, will accelerate for time period $t_a$, will slew for time period $t_s$, and will decelerate for time period $t_d$. At the end of time period $t_d$, all of the joints will concurrently come to a stop. During such times, each moving joint will progress through the motion at the same relative rate; for example, at the time the ith joint completes some percentage of its travel distance, any other moving joint will complete the same percentage of its travel distance.

In an analogous manner, the minimization problem stated by equations (4) through (7) can be solved analytically for the multiple joint case by defining a quantity $t^*$ as follows:

$$t^* = \max_i \left( \frac{Q_i}{V_{limi}}, \left( \frac{Q_i}{A_{limi}} \right)^{\frac{1}{2}} \right). \quad (24)$$

Then, $$t_a = \frac{1}{t^*} \max_i \left( \frac{Q_i}{A_{limi}} \right) \quad (25)$$

$$t_s = t^* - t_a, \text{ and} \quad (26)$$

$$t_d = t_a. \quad (27)$$

The optimization problem stated by equations (12) through (16) can be solved also by graphical techniques. In graphical terms, the relationship between $t_a$, $t_d$ and $t_s$ stated in equation (12) for a joint can be graphed as a series of parallel planes in three-dimensional space for various constant values of total time $t_T$. (That is, each plane will correspond to a particular value of $t_T$). The sloping planes can be called total execution time planes.

For any particular joint, motion of the joint is completed in the same time by any combination of valves for the acceleration time, $t_a$, deceleration time, $t_d$, and slew time $t_s$, which defines a point on the total execution time plane.

In graphical terms, equation (13) can be identified as a limited velocity equation and can be plotted as a plane in three-dimensional space for a given value of $Q_i$ and a given value of $V_{limi}$. Under such conditions, the region above and to the right of the limited velocity plane comprises achievable execution times for motion of the joint, given the velocity constraint. When the limited velocity equation is plotted, a defined set of points can be identified which is unique because there is no other set of points where the region of achievable execution times, given the velocity constraint, is intercepted by a total time plane having a value less than the total time plane which passes through the identified set of points.

Further in graphical terms, equations (14) and (15) can be identified as limited acceleration and limited deceleration equations, respectively. These equations plot as curvilinear surfaces in three-dimensional space for given values of $Q_i$, $D_{limi}$ and $A_{limi}$. The regions encompassed by the curvilinear surfaces each comprise achievable execution times for the motion of the considered joint, given the acceleration and deceleration constraints, respectively. On each curvilinear surface, a tangency point can be identified which represents the minimum execution time for a give motion of the considered joint with the appropriate constraint.

Still further in graphical terms, when both acceleration and velocity are limited for a given motion of a particular joint whose acceleration does not equal its deceleration, the region of achievable execution times for the joint is the region common to the achievable regions defined by the graphs of equations (12) through (16). Associated with such a region will be a point that indicates the minimum total execution time for motion of the single joint. The minimum point will be unique in the sense that there is no point at which a lesser total time plane is tangent to the region of achievable execution times. The $t_a$ axis coordinate for the minimum time point will be the acceleration time for the given displacement of the joint, the $t_s$ axis coordinate will be the slew time, and the $t_d$ axis coordinate will be the deceleration time.

Figure 7:
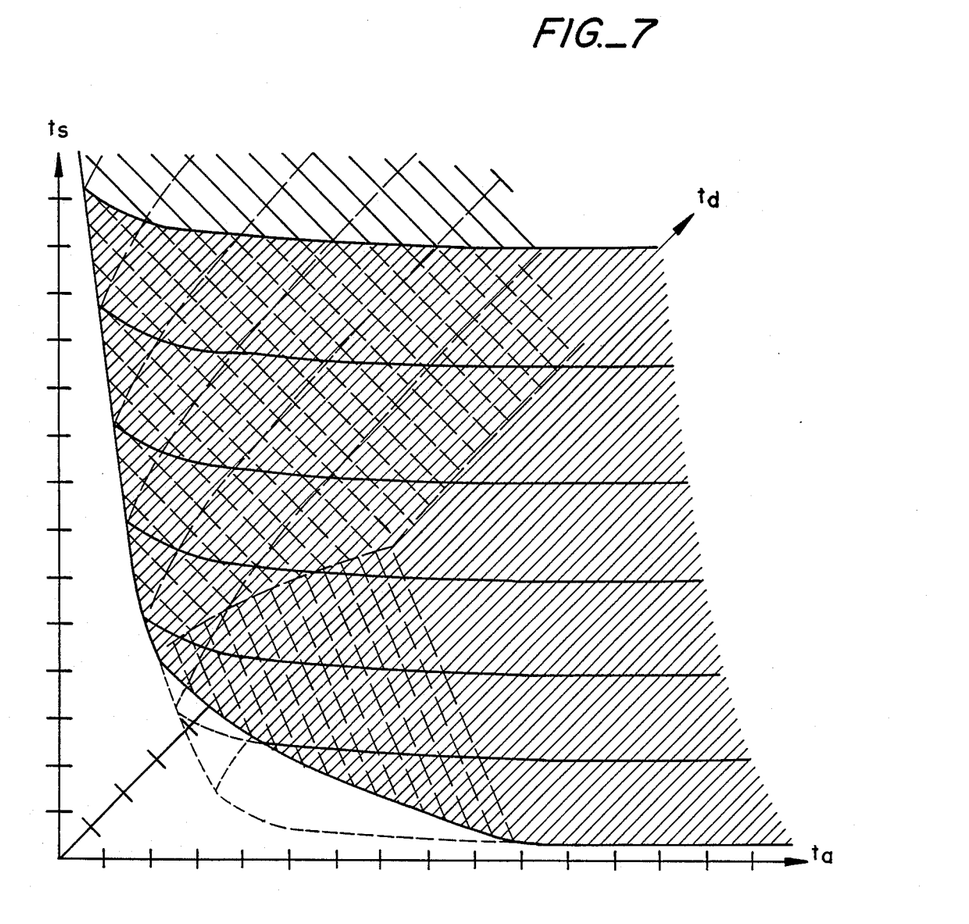
FIG. 7 is a graph showing the region of execution times for coordinated, speed-invariant motion for an end effector of a robot having multiple joints without the assumption that acceleration equals deceleration at each joint.

FIG. 7 illustrates an example of the region of achievable execution times for a particular joint of robot 1 whose acceleration does not equal its deceleration and which moves subject to constraints on maximum acceleration, deceleration and velocity. The achievable execution times for speed-invariant motion of the joint are defined by points encompassed by the three-dimensional surface. The minimum achievable total execution time for the speed-invariant motion is identified at point H on the surface.

For multiple joint motions of robot 1 in the generalized case (i.e., where the accelerations of the respective multiple joints are not necessarily equal to the respective decelerations), each moving joint can be understood to have a region of achievable execution times that can be graphically depicted in three-dimensional space. For a given multi-jointed motion to be speed-invariant, the achievable execution times are defined by the spatial region common to all the regions for achievable execution of the joints considered separately. (The spatial region under such circumstances may have, for example, an appearance similar to the spatial region shown in FIG. 7.) The minimum execution time for ratio-locked motion will be at the point of tangency of the surface of the common spatial region with a total time plane. The three coordinates $t_a$, $t_s$ and $t_d$ at the point of tangency will determine the overall minimum times for the motions of each of the joints. Then, to achieve ratio-locked motion, all of the joints will begin to move at the same time, will accelerate for time period $t_a$, will slew for time period $t_s$, and will decelerate to a concurrent stop for time period $t_d$. Thus, in the generalized case, the minimum execution time for speed-invariant ratio-locked motion of multi-jointed robot 1 will be determined by three joints, at most, regardless of how many joints that robot 1 has. In other words, in accomplishing such ratio-locked motion, at least one moving joint is responsible for determining the acceleration time, at least one other moving joint (or possibly the same joint) is responsible for determining the deceleration time, and at least one moving joint (or one of the two prior joints) is responsible for determining the slew time.

Again, during the period of motion, each moving joint will progress at the same relative rate; that is, at the time the ith joint completes some percentage of its travel distance, any other moving joint will complete the same percentage of its travel distance.

In practice, the above-described methodologies for finding the minimum allowable times for ratio-locked motion are readily executed by appropriate programming of a microprocessor-based computer.

While the embodiments disclosed herein are preferred, it will be appreciated that they are merely examples, and that various alternatives, modifications, variations or extensions thereof may be made by those skilled in the art from this teaching without departing from the invention as set forth in the following claims. For example, workers in the art will appreciate that the accelerations and decelerations of the joints need not be constant since non-constant acceleration and decelerations can be mapped into the above-described functions. Similarly, workers in the art will recognize that motion of the joints need not be linear in cartesian space if the motion is linear in a well-defined non-cartesian space (e.g., cylindrical space). Also, it will be appreciated that the above-described methodologies can be extended to joints having more than one degree of freedom by decomposing such motion into component motions, each having a single degree of freedom. Still further, workers skilled in the art will recognize that the above-described methodologies can be applied not only to the motion of robotic joints, but to motions of various other machines such as plotters, machine tools, and the like which have servo-controlled linkages that move items from place to place.

We claim:

1. A kinematic method to operate a multijointed robot to achieve coordinated, speed-invariant motion when the robot's end effector is moved along a predefined path comprising the steps of:
   defining a total execution time function for each path segment which is a function of acceleration time, slew time, and deceleration time for each of the joints;
   for each of the joints, calculating values for the acceleration time, slew time, and deceleration time which minimize the total time function subject to constraints on the displacements of the joints, the limiting velocities of the joints, the limiting accelerations of the joints, and the limiting decelerations of the joints;

operating the end effector of the robot such that all joints start and stop moving at the same time and at least one moving joint is responsible for determining the acceleration time, at least one other moving joint (or possibly the same joint) is responsible for determining the deceleration time, and at least one moving joint (or one of the two prior joints) is responsible for determining the slew time.

2. A method according to claim 1 wherein the total execution time function, $t_T$, for a path segment is defined as $$t_T = t_a + t_s + t_d,$$

wherein $t_T$ is the total time for motion of the joints, $t_a$ is acceleration time, $t_s$ is slew time, and $t_d$ is deceleration time for the joints.

3. A method according to claim 2 wherein the constraints are $$t_a + 2t_s + t_d \geq \frac{2Q_i}{V_{limi}},$$

$$t_a^2 + 2t_a t_s + t_a t_d \geq \frac{2Q_i}{A_{limi}},$$

$$t_d^2 + 2t_d t_s + t_d t_a \geq \frac{2Q_i}{D_{limi}}, \text{ and}$$

$$t_a, t_s, t_d \geq 0,$$

where:

$Q_i$ is the given displacement of any one joint (i.e., the ith joint);
$V_{limi}$ is limiting velocity for the ith joint;
$A_{limi}$ is limiting acceleration for the ith joint; and
$D_{limi}$ is limiting deceleration for the ith joint.

4. A method according to claim 3 wherein, for quantities $t^*$, $t^*_a$, $t^*_s$ and $t^*_d$ where:

$$t_s^* = \max_i \left( \frac{2Q_i}{V_{limi}} \right)$$

$$(t_a^*)^2 = \max_i \left( \frac{2Q_i}{A_{limi}} \right)$$

$$(t_d^*)^2 = \max_i \left( \frac{2Q_i}{D_{limi}} \right), \text{ and}$$

$$t^* = \max \{t_s^*, [(t_a^*)^2 + (t_d^*)^2]^{\frac{1}{2}}\}.$$

the quantities $t_a$, $t_d$ and $t_s$ have the following values:

$$t_a = \frac{(t_a^*)^2}{t^*}$$

$$t_d = \frac{(t_d^*)^2}{t^*}, \text{ and}$$

$$t_s = \frac{(t^* - t_a - t_d)}{2}.$$

5. A method according to claim 1 wherein, for each joint, the acceleration of the joint is controlled to be the same as the deceleration of the 6. A method according to claim 5 wherein the total execution time function, $t_T$, for a path segment is defined as $$t_T = 2t_a + t_s$$

wherein $t_T$ is the total time for motion of the joints, $t_a$ is acceleration time, and $t_s$ is slew time.

7. A method according to claim 6 wherein the constraints are:

$$t_a + t_s \geq \frac{Q_i}{V_{limi}},$$

$$t_a^2 + t_a t_s \geq \frac{Q_i}{A_{limi}}, \text{ and}$$

$$t_a, t_s \geq 0,$$

where:

$Q_i$ is the given displacement of any one joint (i.e., the ith joint);
$V_{limi}$ is limiting velocity for the ith joint; and
$A_{limi}$ is limiting acceleration for the ith joint.

8. A method according to claim 7 wherein, for a quantity $t^*$ such that $$t^* = \max_i \left( \frac{Q_i}{V_{limi}}, \left( \frac{Q_i}{A_{limi}} \right)^{\frac{1}{2}} \right),$$

the quantities $t_a$, $t_s$ and $t_d$ are determined to have the following values:

$$t_a = \frac{1}{t^*} \max_i \left( \frac{Q_i}{A_{limi}} \right)$$

$$t_s = t^* - t_a, \text{ and}$$

$$t_d = t_a.$$

9. A method for operating a robot having an end effector and a plurality of joints, each of which is driven by an individually controllable servo motor to achieve coordinated, minimum-time motion which is speed-invariant when the end effector is moved along a predefined path segment, comprising the steps of:

defining a total execution time function, $t_T$, for the path segment such that:

$$t_T = t_a + t_s + t_d$$

wherein $t_T$ is the total time for motion of the joints, $t_a$ is acceleration time, $t_s$ is slew time, and $t_d$ is deceleration time;

determining values for the acceleration times, deceleration times and slew times for the moving joints of the robot which minimize total execution time subject to the constraints that:

$$t_a + 2t_s + t_d \geq \frac{2Q_i}{V_{limi}},$$

$$t_a^2 + 2t_a t_s + t_a t_d \geq \frac{2Q_i}{A_{limi}},$$

$$t_d^2 + 2t_d t_s + t_d t_a \geq \frac{2Q_i}{D_{limi}}, \text{ and}$$

-continued $$t_a, t_s, t_d \geq 0,$$

where:
$Q_i$ is the given displacement of any one joint (i.e., the ith joint);
$V_{limi}$ is limiting velocity for the ith joint;
$A_{limi}$ is limiting acceleration for the ith joint; and
$D_{limi}$ is limiting deceleration for the ith joint; and
operating the end effector of the robot such that all joints start and stop their motion at the same time and at least one moving joint is responsible for determining the acceleration time, at least one other moving joint (or possibly the same joint) is responsible for determining the deceleration time, and at least one moving joint (or one of the two prior joints) is responsible for determining the slew time.

10. A method according to claim 9 wherein the servo motors are controlled such that, for each joint, the acceleration time of the joint is equal to the deceleration time.

11. A method according to claim 9 wherein the total execution time function, $t_T$, for a path segment is defined as $$t_T = 2t_a + t_s$$

wherein $t_T$ is the total time for motion of the joints, $t_a$ is acceleration time, and $t_s$ is slew time.

12. A method according to claim 11 wherein the constraints are:

$$t_a + t_s \geq \frac{Q_i}{V_{limi}},$$

$$t_a^2 + t_a t_s \geq \frac{Q_i}{A_{limi}}, \text{ and}$$

$$t_a, t_s \geq 0,$$

where:
$Q_i$ is the given displacement of any one joint (i.e., the ith joint);
$V_{limi}$ is limiting velocity for the ith joint; and
$A_{limi}$ is limiting acceleration for the ith joint.

13. A method according to claim 12 wherein, for a quantity $t^*$ such that $$t^* = \max_i \left( \frac{Q_i}{V_{limi}}, \left(\frac{Q_i}{A_{limi}}\right)^{\frac{1}{2}} \right),$$

the quantities $t_a$, $t_s$ and $t_d$ have the following values:

$$t_a = \frac{1}{t^*} \max_i \left( \frac{Q_i}{A_{limi}} \right)$$

$$t_s = t^* - t_a, \text{ and}$$

$$t_d = t_a.$$

14. A method to operate a multi-jointed robot to achieve coordinated, speed-invariant motion of an end effector along a predefined path comprising the steps of:
defining a total execution time function for each path segment which is a function of acceleration time, slew time, and deceleration time for each of the joints;
calculating periods for the acceleration time, slew time, and deceleration time which minimize the total execution time function subject to constraints on the displacement of the joint, the limiting velocity, the limiting acceleration, and the limiting deceleration;
operating the end effector of the robot such that all joints start moving at the same time and all joints accelerate for the calculated minimum acceleration time period, all joints slew for the minimum calculated slew time period, and all joints decelerate for the minimum calculated deceleration time period.

15. A method according to claim 14 wherein all joints stop moving at the same time and at least one moving joint operates at its limiting acceleration, at least one other moving joint (or the same joint) operates at its limiting deceleration, and at least one other moving joint (or one of the two prior joints) operates at its limiting velocity.

16. A method according to claim 14 wherein the total execution time function, $t_T$, for the path segment is defined as $$t_T = t_a + t_s + t_d,$$

wherein $t_T$ is the total time for motion of the joints, $t_a$ is acceleration time, $t_s$ is slew time, and $t_d$ is deceleration time.

17. A method according to claim 16 wherein the constraints are $$t_a + 2t_s + t_d \geq \frac{2Q_i}{V_{limi}},$$

$$t_a^2 + 2t_a t_s + t_a t_d \geq \frac{2Q_i}{A_{limi}},$$

$$t_d^2 + 2t_d t_s + t_d t_a \geq \frac{2Q_i}{D_{limi}}, \text{ and}$$

$$t_a, t_s, t_d \geq 0,$$

where:
$Q_i$ is the given displacement of any one joint (i.e., the ith joint);
$V_{limi}$ is limiting velocity for the ith joint;
$A_{limi}$ is limiting acceleration for the ith joint; and
$D_{limi}$ is limiting deceleration for the ith joint; and 18. A method according to claim 17 wherein, for quantities $t^*$, $t^*_a$, $t^*_s$ and $t^*_d$, where:

$$t_s^* = \max_i \left( \frac{2Q_i}{V_{limi}} \right)$$

$$(t_a^*)^2 = \max_i \left( \frac{2Q_i}{A_{limi}} \right)$$

$$(t_d^*)^2 = \max_i \left( \frac{2Q_i}{D_{limi}} \right), \text{ and}$$

$$t^* = \max \{t_s^*, [(t_a^*)^2 + (t_d^*)^2]^{\frac{1}{2}}\}.$$

the quantities $t_a$, $t_d$ and $t_s$ have the following values:

$$t_a = \frac{(t_a^*)^2}{t^*}$$

$$t_d = \frac{(t_d^*)^2}{t^*}, \text{ and}$$

$$t_s = \frac{(t^* - t_a - t_d)}{2}.$$

19. A method according to claim 15 wherein, for each moving joint, the acceleration of the joint is controlled to be the same as the deceleration of the joint.

20. A method according to claim 19 wherein the total execution time function, $t_T$, for the path segment is defined as $$t_T = 2t_a + t_s$$

wherein $t_T$ is the total time for motion of the joints, $t_a$ is acceleration time and $t_s$ is slew time.

21. A method according to claim 20 wherein the constraints are:

$$t_a + t_s \geq \frac{Q_i}{V_{limi}},$$

$$t_a^2 + t_a t_s \geq \frac{Q_i}{A_{limi}}, \text{ and}$$

$$t_a, t_s \geq 0,$$

where:
$Q_i$ is the given displacement of any one joint (i.e., the ith joint);
$V_{limi}$ is limiting velocity for the ith joint; and
$A_{limi}$ is limiting acceleration for the ith joint.

22. A method according to claim 21 wherein, for a quantity $t^*$ as follows, $$t^* = \max_i \left\{ \frac{Q_i}{V_{limi}}, \left(\frac{Q_i}{A_{limi}}\right)^{\frac{1}{2}} \right\},$$

the quantities $t_a$, $t_s$ and $t_d$ have the following values:

$$t_a = \frac{1}{t^*} \max_i \left\{ \frac{Q_i}{A_{limi}} \right\}$$

$$t_s = t^* - t_a, \text{ and}$$

$$t_d = t_a.$$

* * * * *

UNITED STATES PATENT AND TRADEMARK OFFICE
CERTIFICATE OF CORRECTION

PATENT NO. : 4,864,205

DATED : September 5, 1989

INVENTOR(S) : William D. Fisher
M. Shahid Mujtaba

It is certified that error appears in the above-identified patent and that said Letters Patent is hereby corrected as shown below:

Column 8, line 38, "through the motion" should read -- through its motion --

Column 9, line 29, "for a give motion" should read -- for a given motion --

Column 11, line 68, "deceleration of the" should read -- deceleration of the joint. --

Signed and Sealed this

Twenty-fifth Day of December, 1990

*Attest:*

HARRY F. MANBECK, JR.

*Attesting Officer*  *Commissioner of Patents and Trademarks*